June 7, 1932.  W. E. N. GORRIE  1,862,262
EQUALIZING MECHANISM FOR VEHICLES
Filed Sept. 20, 1928
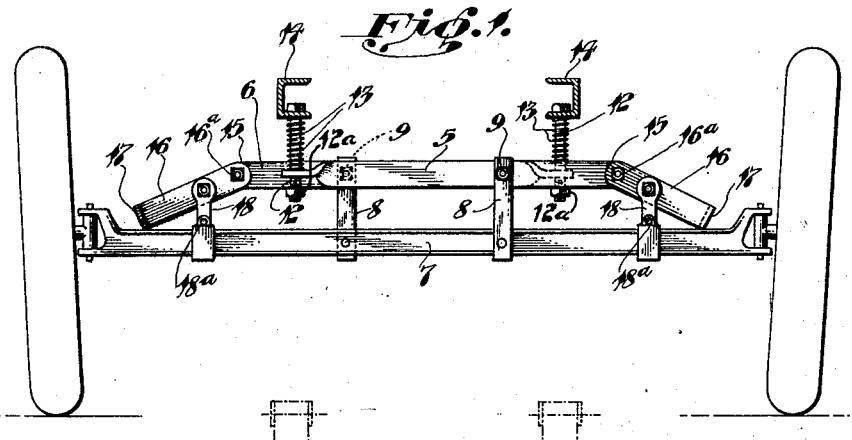
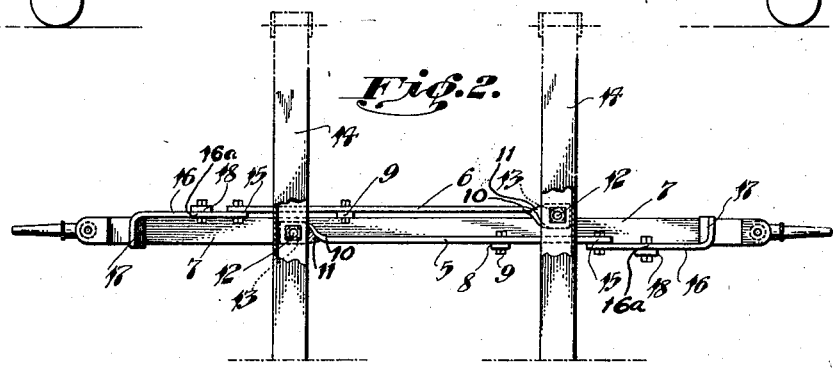
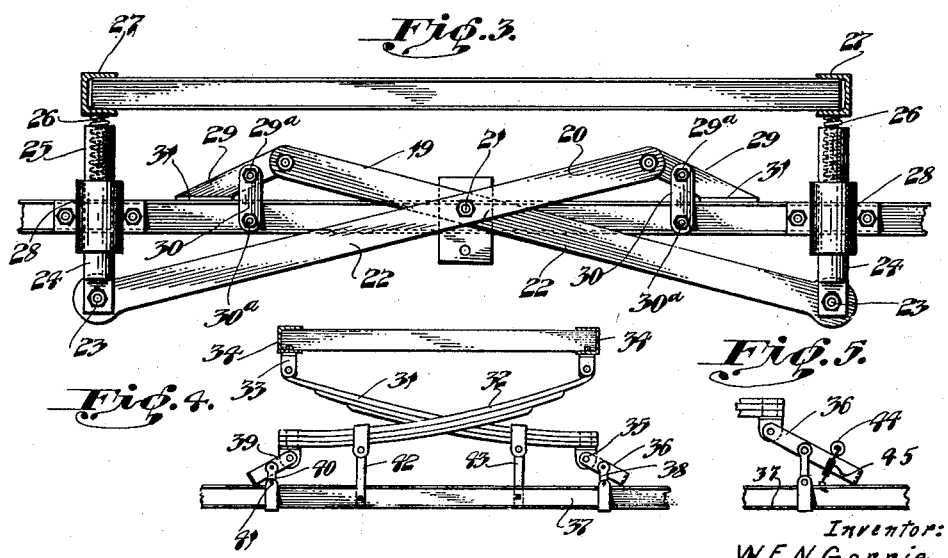
Inventor:
W.E.N. Gorrie Patented June 7, 1932

1,862,262

UNITED STATES PATENT OFFICE

WILLIAM EDWARD NICKOLS GORRIE, OF MIDDLE PARK, NEAR MELBOURNE, VICTORIA, AUSTRALIA

EQUALIZING MECHANISM FOR VEHICLES

Application filed September 20, 1928, Serial No. 307,234, and in Australia May 22, 1928.

This invention relates to equalizing mechanism applicable to vehicles and has been devised for the purpose of absorbing shocks in running as well as to limit the side sway or lurch of the body of a vehicle particularly when turning corners or curves.

The invention is particularly applicable for damping shocks imparted by the wheels to the chassis.

The capsizing of vehicles owing to side sway or lurch is not uncommon and is dangerous to human life but hitherto no effective means have been applied to a vehicle additionally to ordinary factors or safety, for overcoming the possibility of capsize.

This invention has been devised for the purpose of providing simple and effective mechanism applicable to vehicles, road or rail, which will ensure the efficient damping of shocks and also the equalization of the balance of the body on the undercarriage or axle under all working conditions.

The basic principle underlying this invention consists in means for imparting resiliency between the body of the vehicle and the undercarriage at the same time limiting the vertical movement of said body by means which not only absorb shocks but also limit the side sway or lurch of the said body, said means being characterized by the combination of lever and link mechanism and buffers such as springs disposed laterally of the vehicle between the undercarriage and the chassis or body.

An essential feature of the invention comprises co-acting members pivoted at a predetermined point to the axle bar or undercarriage and yielding buffer members arranged and operating between the said co-acting members and the chassis.

A further essential characteristic of the invention consists in the arrangement of means whereby the shock absorbing as well as the equalizing function is obtained and the means contemplated in this invention comprise two spaced parallel arms on edge or leaf springs normally horizontal and retained in yielding relationship with the axle bar or undercarriage by standards secured thereto, said parallel arms being turned at one and opposite ends to present a horizontal portion adapted to receive a bolt and spring which support the chassis at each side, the opposite ends of each arm pivotally connecting a link member of similar section, the lower end of which is turned for a short distance at approximately a right angle to frictionally engage with the upper surface of the axle bar or undercarriage, said link members being independently pivoted at a suitable point to the axle bar or undercarriage by standards secured thereto.

A further essential feature embodied in the invention consists in providing the leaf springs in yielding relationship between the chassis or body and links slidably arranged on the axle bar or undercarriage, one of said slidable links being mounted to each of the lower ends of the leaf springs, each slidable link being pivoted to a link connecting the axle bar or undercarriage, the construction being such that increased resiliency is imparted between the undercarriage or axle and the chassis or body.

In order that the invention may be more readily understood, reference will now be made to the accompanying drawing in which:—

Figure 1 is a view in front elevation of the apparatus applied to an automobile.

Figure 2 is a plan thereof.

Figure 3 is a view in front elevation of an alternative form of apparatus, and

Figure 4 is a view in front elevation of a modified construction of apparatus.

Figure 5 is a view of a detail in construction.

According to one form of carrying the invention into practical effect, two spaced parallel arms 5 and 6 are provided on edge and normally horizontal, said arms being maintained in yielding relationship with the axle bar 7 by standards 8 pivoted as at 9 to the arms 5 and 6 which are turned at the one and opposite ends 10 to present a horizontal face 11 drilled to receive a bolt 12 and spring or buffer 13 connecting the chassis members 14 at each side thereof, said bolts and springs acting as yielding buffers between the horizontal arms and the chassis.

The opposite end 15 of each arm 5 and 6 pivotally connects a sliding link member 16 of similar section, the lower end 17 of which is turned at right angles a short distance to functionally engage with the upper surface of the axle bar 7.

Each sliding link member 16 is independently pivoted as at 16a to a holding link 18 pivoted at 18a to the axle bar 7.

The bolts 12 extend through the horizontal faces 11 of the arms 5 and 6 for a short distance and are fitted with nuts 12a at the base thereof, the springs 13 being disposed around the bolts 12 between the horizontal arms and the chassis members 14 as illustrated in Figure 1.

As the body of the vehicle or automobile is supported by the chassis, the mechanism above described, not only absorbs shocks imparted but has thus a holding down function on each side of said body which maintains the balance of the vehicle or automobile body in relation to the undercarriage or axle bar and effectively damps the shocks and also the side sway or lurch of the body which is particularly apparent in vehicles as at present constructed on turning corners or curves at speed.

When a shock, swaying pressure or lurch takes place, it is equalized by the mechanism by means of the yielding buffers, the pressure being taken by the buffer on which side of the automobile or vehicle the swaying or lurching takes place, the spring 13 of said buffer taking the pressure and on compression allows the corresponding arms 5 or 6 to rise from its pivot position 15 with the link member 16 which slides outwardly on the axle bar 7, to effect the neutralization of the swaying pressure, the members resuming their normal relationship when this is effected. Thus when the vehicle or automobile is in motion, the body thereof is maintained in a positive and vertical position irrespective of the inclination of the axle so maintaining the balance of same, the buffers taking the pressure according to the direction or side it is exerted, movement being imparted to the co-acting arms 5 and 6 which pivot with the link members 16, causing them to slide upon the axle 7 to equalize the swaying pressure exerted.

Thus when an automobile or vehicle is traveling on an inclined surface or the side of a road, the mechanism previously described maintains the body of the automobile or vehicle evenly balanced notwithstanding the inclination at which it is travelling.

As illustrated in Figure 3, in lieu of the co-acting parallel arms 5 and 6 diagonally disposed lever arms 19 and 20 may be used, pivoted together as at 21 to the undercarriage or axle 7 substantially at the centre thereof, the lower ends 22 of the lever arms extending in opposite directions to each side of the vehicle and pivotally connect as at 23 a vertically sliding rod 24, the upper end 25 of which is recessed and is fitted with a spring or buffer 26 on which that side of the chassis or frame 27 of the body rests, the vertically sliding rod 24 moving in a bearing or sleeve 28 fitted to the axle 7 or undercarriage.

The sliding rods 24 in which the springs or buffers 28 are recessed support the chassis or frame of the vehicle body on each side and act as yielding buffers therefor to effect the functions as herein described.

The other and uppermost end of each lever arm 19 and 20 extends on the other side of the pivot 21 to pivotally connect a short arm 29 centrally pivoted at 29a to a link 30 pivoted at 30a to the undercarriage or axle 7, the lower end of each short arm 29 is flat surfaced as at 31 and is in sliding engagement with an upper surface on the undercarriage or axle 7.

The chassis or frame 27 supporting the vehicle body is thus balanced and supported on each side and below the same by the springs 26 sliding arms 24, pivoted lever arms 19 and 20 and pivoted short arms 29 in sliding contact with the undergear or axle 7, the links 30 forming a support for the sliding arms 29, as above described.

Should a shock or swaying pressure take place on either side of the vehicle or automobile body it is taken by the spring 25 on that side and transmitted downwardly through the sliding rod 24 to the diagonal lever arm 19 or 20 and thence imparts an upward movement to the pivoted short arm 29 which sliding on its adjacent surface on the undercarriage or axle 7 holds the vehicle body up to normal balance, absorbs shocks and maintains a maximum of safety under all conditions.

The equalizing and damping mechanism as above described can be readily attached as an accessory to automobiles, railway, tramway or road vehicles of all descriptions and is so arranged that the body is supported on the springs or other buffers while the mechanism is mounted on the undercarriage or axle in any suitable way.

As illustrated in Figure 4 a simplified construction with increased resiliency is provided and in lieu of the levers and springs above described, resilient members such as leaf springs 31, 32 are disposed so that they preferably cross each other without contact from side to side.

The upper end of the leaf spring 31 connects by a shackle 33 with the chassis 34 and extends to the opposite side to a lower plane where it is pivotally connected at 35 to a link 36, the opposite end of the link 36 being in slidable engagement with the axle bar 37 or undercarriage.

Midway between the ends of the link 36 it is pivotally connected to a link 38 which in turn pivotally connects the axle bar 37.

The leaf spring 32 extends from the opposite side of the chassis and to a lower plane where it pivotally connects the link 39, the opposite end of which slides on the axle bar 37 or undercarriage, while between the ends of the link 39, the latter pivotally connects a link 40 which pivots at 41 on the axle bar or undercarriage.

Both the springs 31, 32 are supported by arms 42, 43 either centrally disposed or to that side of the centre towards the links 36, 39 as illustrated.

The operative function is identical with the functions above described with the additional functions that the leaf springs 31, 32 give greater resiliency to the parts.

If desired and in order to maintain the links 16, 29, 36 and 39 always in contact with the axle bar or undercarriage, a spring or other device may be fitted between the said links and axle bar.

This function may be effected by the means illustrated in Figure 4 in which the links 16, 29, 36, 39 may be held down by a roller 44 moving over the face of the link and held by a spring 45 anchored to the axle bar or undercarriage as shown.

The apparatus is fitted to both ends and if desired, in any intermediate position of the body but I desire it to be understood that the mechanism can be mounted at any one point as conditions require.

Mechanism arranged and operating as above described will be of great utility and a distinct and added factor of safety and economy in running and any suitable improvements or modifications may be embodied without departing from the spirit and scope of the invention, the essential feature of which consists in the combination of a series of pivoted levers or resilient members, links and buffers, preferably disposed laterally of the vehicle and adapted to damp shocks and to support the vehicle body and maintain the normal balance of the body in relation to the undergear or axle under all running conditions.

What I claim as my invention and desire to secure by Letters Patent is:—

1. In a vehicle, an axle bar, standards rigidly secured to the said axle bar, spaced parallel bars pivoted to the said standards, bolts engaging with the chassis of the vehicle, one end of each of the said bars being turned at right angles to receive a corresponding one of the said bolts, a spring about each of the said bolts and mounted between the bars and the chassis, normally vertical link members mounted on the axle bar, and arms pivotally engaging with their inner ends the said spaced parallel bars, the upper ends of the said link members pivotally engaging with the said last mentioned arms, the said arms being provided with right angled portions, the edges of which are in sliding contact with the upper edge of the axle bar.

2. Apparatus for absorbing shocks in vehicles or the like, comprising a chassis, an axle bar therein, standards carried by the axle bar, spaced parallel arms pivoted to the said standards, bolts and cooperating springs supporting the chassis from the said axle bar, one end of each of the said arms being connected to a corresponding bolt, and links independently pivoted on the said spaced parallel arms, the lower ends of the said links being turned at right angles for a short distance to frictionally engage the said axle bar.

3. Apparatus for absorbing shocks and the like in vehicles comprising a chassis, an axle bar, buffers, and spaced parallel arms, the said arms each being normally horizontal and being retained in yielding contact with the axle bar and the corresponding side of the chassis by means of the said buffers, the said buffers each comprising a bolt extending from a turned portion of the corresponding end of the corresponding arm and a spring disposed around the said bolt between the chassis and the turned portion of the arm, and links to which the opposite ends of the arms are engaged, and which links are in pivotal and frictional engagement with the axle bar.

4. Apparatus for absorbing shocks in vehicles and the like comprising a chassis, an axle bar, spaced parallel arms normally horizontal and in yielding relation to the axle bar, yielding buffers supporting the chassis from the axle bar and to which the said arms are connected at one of their ends, and links frictionally engaging with the axle bar and to which the opposite ends of the said arms are pivotally connected.

5. Apparatus for absorbing shocks in vehicles or the like comprising a chassis, an axle bar, coacting members pivoted at a selected point to the said axle bar, links pivoted to and in frictional engagement with the said axle bar, the said coacting members being pivoted at one end to a corresponding link, the ends of the coacting members which are connected to the links being opposite to each other, and yielding buffers arranged and operated between the said coacting members and the chassis, to which buffers the other ends of the said coacting members are connected.

Signed at Melbourne, Victoria, Australia, this 23rd day of August, A. D. 1928.

WILLIAM EDWARD NICKOLS GORRIE.